United States Patent [19]

Simic

[11] Patent Number: 5,356,197
[45] Date of Patent: Oct. 18, 1994

[54] COMBINATION CHAIR, DOLLY AND TABLE APPARATUS

[76] Inventor: Milorad Simic, 2912 Calle Estepa, Thousand Oaks, Calif. 91360

[21] Appl. No.: 966,527

[22] Filed: Oct. 26, 1992

[51] Int. Cl.$^5$ .............................................. A47C 13/00
[52] U.S. Cl. .................................. 297/129; 280/47.18
[58] Field of Search ...................... 297/129, 183, 54; 280/47.18, 47.25, 648, 655

[56] References Cited

U.S. PATENT DOCUMENTS

| | | | |
|---|---|---|---|
| 4,367,547 | 3/1983 | Dominko | 280/47.18 X |
| 4,703,944 | 11/1987 | Higson | 297/129 X |
| 4,733,905 | 3/1988 | Buickerood et al. | 297/129 |
| 5,062,650 | 11/1991 | Chang | 297/129 |
| 5,161,811 | 11/1992 | Cheng | 280/655 |
| 5,201,536 | 4/1993 | Bono et al. | 280/47.18 X |

*Primary Examiner*—Peter R. Crown
*Attorney, Agent, or Firm*—Jack C. Munro

[57] ABSTRACT

A combination chair, dolly and table which is formed of an interconnected leg rest section, seat section and back rest section. The leg rest section is pivotally connected to one end of the seat section with the back rest section also pivotally connected at the opposite end of the seat section with the leg rest section and the seat section capable of being positioned in juxtaposition with the seat section or each locatable to an extended position which is in substantial alignment with the seat section. Mounted on the bottom surface of the seat section is an extendable wheel assembly and a separate extendable leg assembly. An extendable handle assembly is also connected to the seat section. With both the leg assembly and the wheel assembly located respectively in their usable positions, the apparatus is capable of being used as either a chair or as a table. With the wheel assembly located in a usable position and the leg assembly located in a stowage position with the handle assembly located in its extended position, the apparatus is usable as a dolly with a separate extendable bottom bar being moved to an extended position.

4 Claims, 3 Drawing Sheets

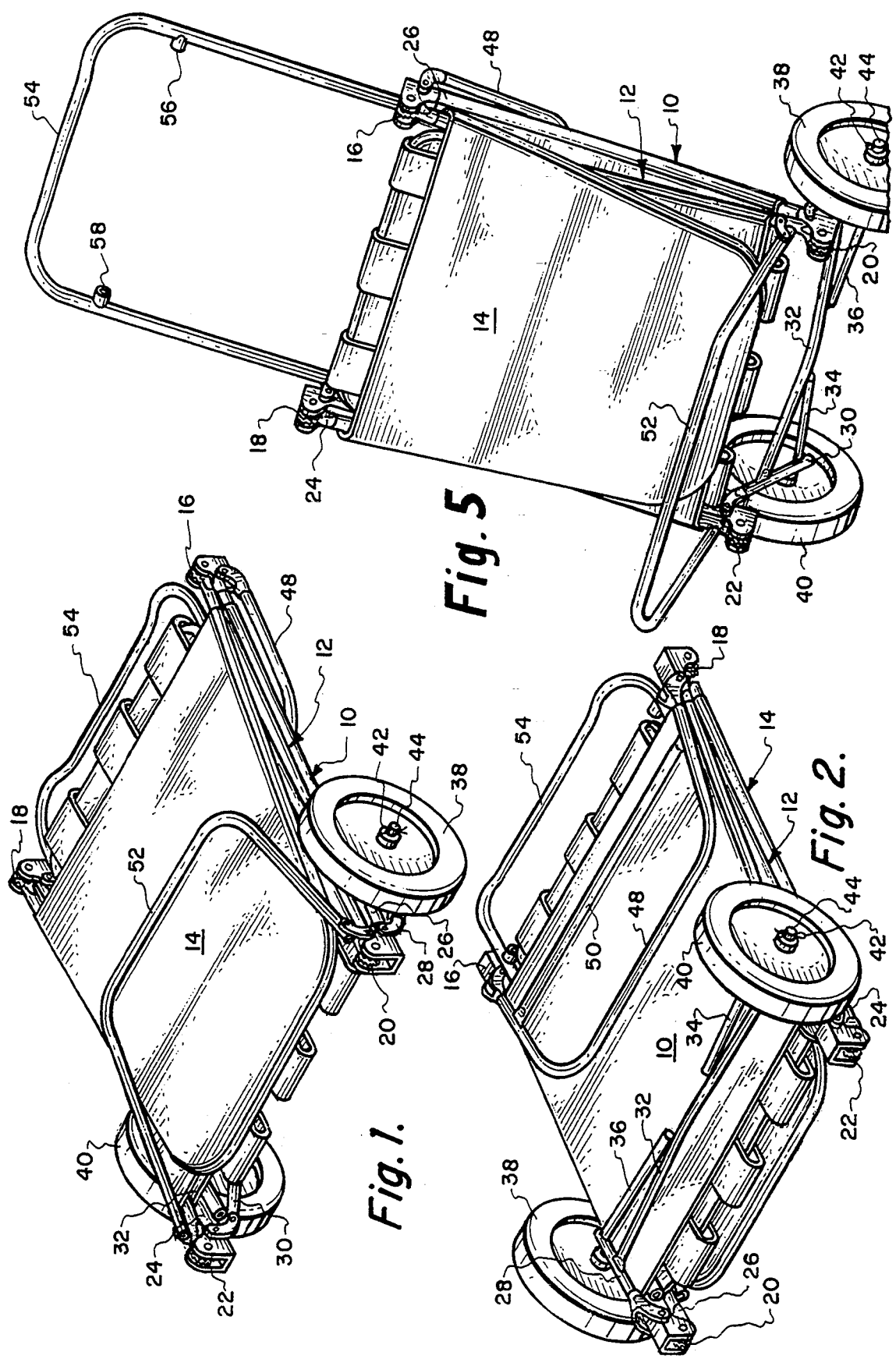

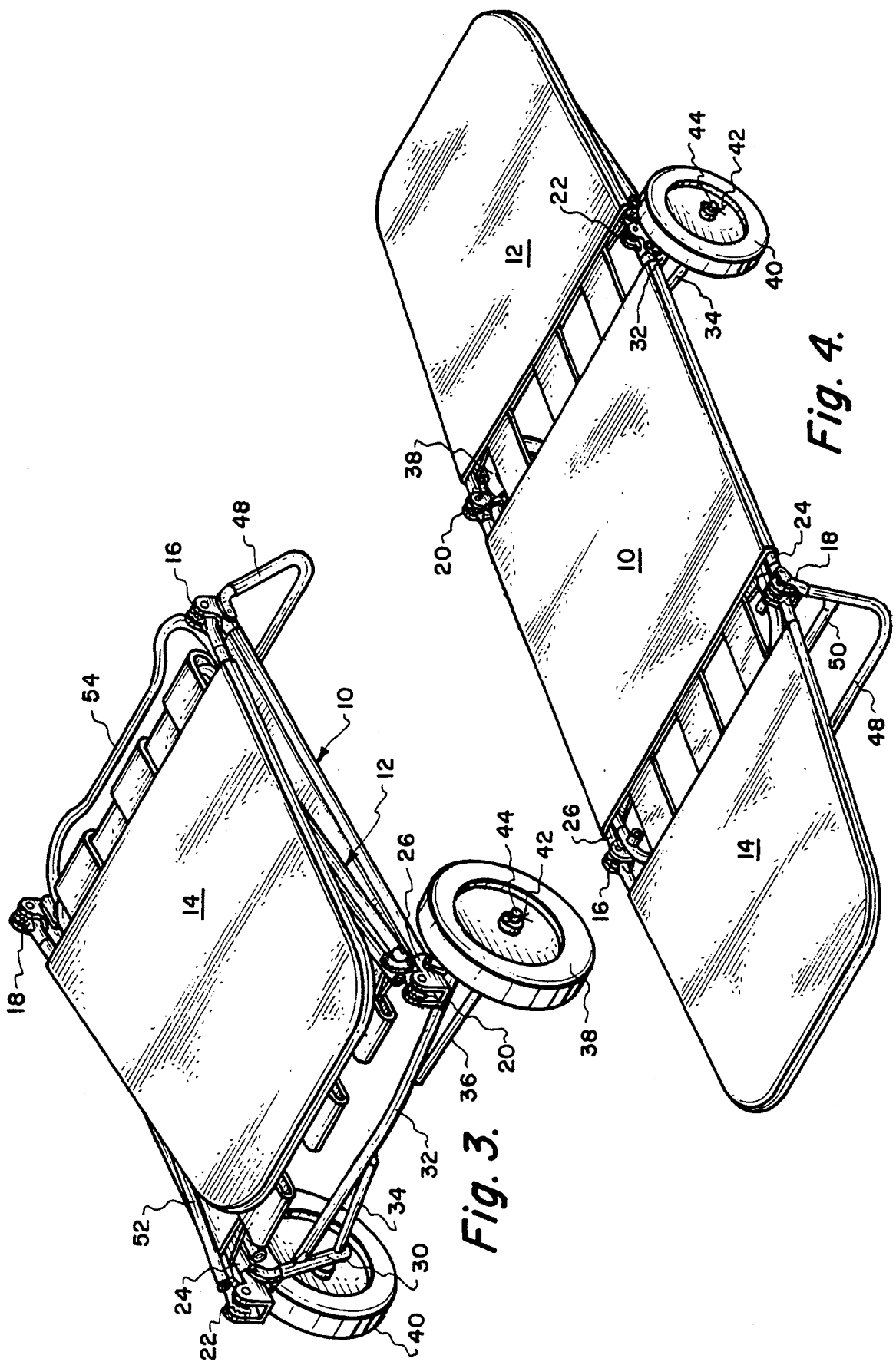

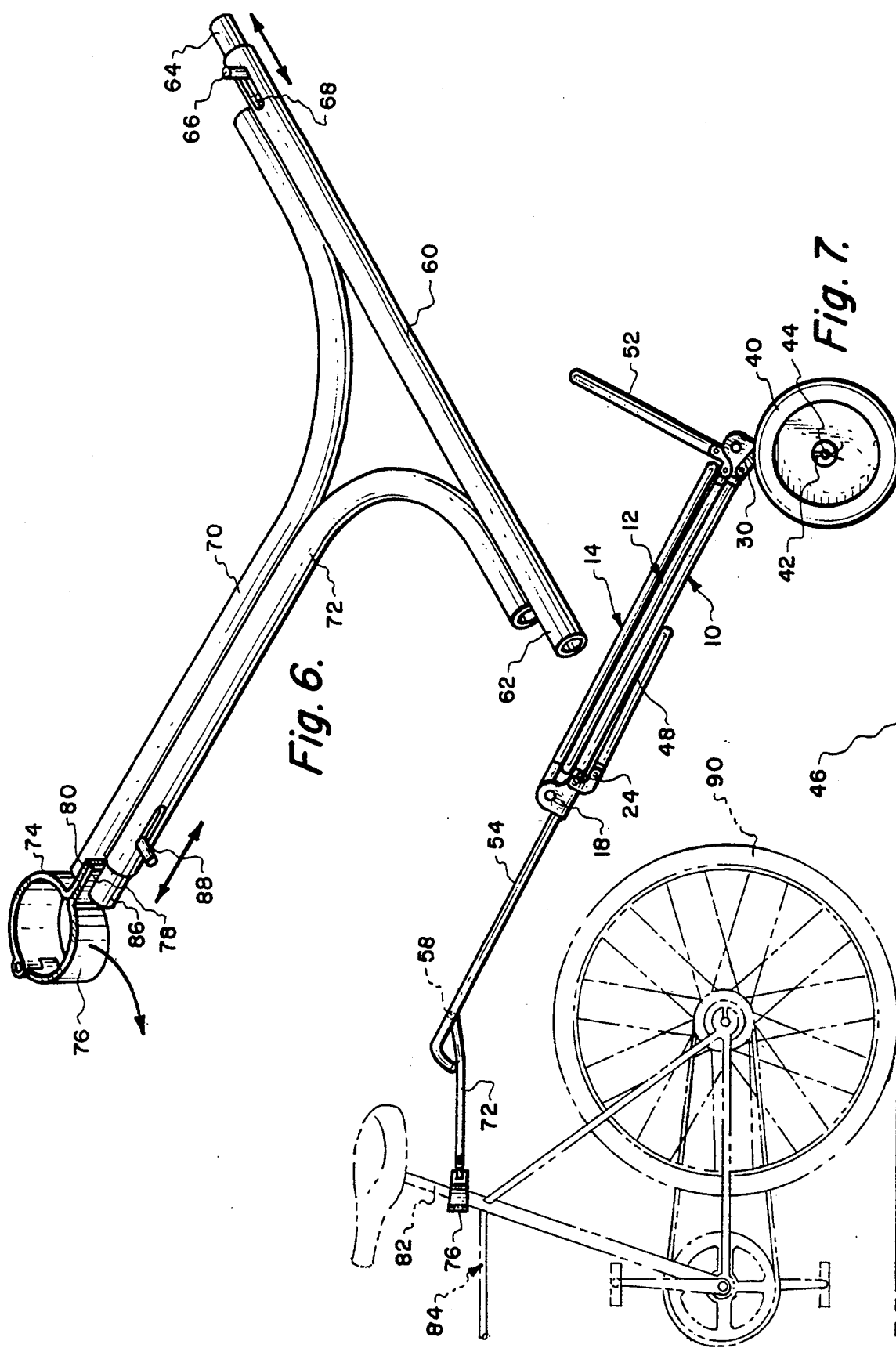

COMBINATION CHAIR, DOLLY AND TABLE APPARATUS

BACKGROUND OF THE INVENTION

1. Field of the Invention

This invention relates to a lounge chair which can be converted to a dolly or a table that is capable of being connected to a towing vehicle such as a bicycle and which is capable of being folded up into a small space for storage.

2. Description of the Prior Art

Chaise lounges with adjustable angle back rest sections and adjustable angle leg rest sections have found widespread application as lawn, poolside, patio and beach furniture. It has been common within the prior art to utilize wheels in conjunction with the chaise lounge. It has been common to also use chaise lounges in conjunction with the wheels as a dolly. It has also been known to design the chaise lounge so that it is capable of being folded to a substantially smaller space for the reason of storage.

When utilizing of a chaise lounge on the beach, it has been known to position the lounge as a dolly to transport articles that are usable at the beach such as an ice chest, blankets, fishing gear, umbrella and so forth. It has also been known to construct the chaise lounge in a manner to be usable as a table when located at the beach. However, such structures of the prior art, when utilized as a chaise lounge chair, have not been designed to be particularly comfortable to the human user. Additionally, when the apparatus is to be placed in storage, it has not been designed to occupy an exceedingly small amount of space which facilitates storage.

SUMMARY OF THE INVENTION

The primary objective of the present invention is to construct a multiple purpose apparatus which can be placed in a position to be used as a chaise lounge type of chair, a table or a dolly.

Another objective of the present invention is when the apparatus is utilized as a dolly it is capable of being towed by a towing vehicle such as a bicycle.

Another objective of the present invention is to construct an apparatus which when folded up for storage occupies a small amount of space.

Another objective of the present invention is to construct a apparatus which has several purposes but when utilized as a chair is comfortable to the human being user.

A still further objective of the present invention is to construct a multipurpose apparatus which can be manufactured at a reasonable cost and thereby sold to the ultimate consumer at a reasonable cost.

The apparatus of the present invention, when in the position of a chaise lounge type of chair, has a seat section from which extends in an aft direction a back rest section with a leg rest section extending from the opposite end of the seat section in a forward direction. Both the leg rest section and the back rest section are capable of folding up on the seat section with all three sections located in a stacked relationship. Incorporated with the apparatus is a wheel assembly with this wheel assembly being movable between an upper (storage) position and a lower (usable) position. With the wheels in the lower position, a separate leg assembly is capable of being moved from a withdrawn position to an out position which will permit the apparatus to be utilized as a table when the different sections are in the stacked relationship. Again, with the sections in the stacked relationship, a bottom bar is capable of being pivoted to an outward position with a separate handle assembly being moved from a retracted position to a protracted position which will then permit the apparatus to be utilized as a dolly. When in this dolly position, the leg assembly is moved to the withdrawn position. When in the dolly position the handle assembly can be connected to a hitch of a towing vehicle such as a bicycle. When the leg assembly is in the withdrawn position and the bottom bar is in its stowage position and the handle assembly is located in its retracted position, the leg rest section can be pivoted forwardly and in substantial alignment with the seat section and the back rest section pivoted rearwardly assuming either a substantial aligned position with the seat section or at an inclined transverse position relative to the seat section permitting the apparatus to then be used as a chaise lounge type of chair.

BRIEF DESCRIPTION OF THE DRAWINGS

FIG. 1 is a top isometric view of the apparatus of the present invention showing the apparatus in the collapsed position facilitating storage;

FIG. 2 is a bottom isometric view of the apparatus of the present invention showing the apparatus in the, again, collapsed position;

FIG. 3 is an isometric view similar to FIG. 1 showing the apparatus of the present invention in the table position;

FIG. 4 is an isometric view of the apparatus of the present invention showing it in the chaise lounge chair position;

FIG. 5 is an isometric view of the apparatus of this invention showing it in the dolly position;

FIG. 6 is an isometric view of a towing bar which is to be utilized in conjunction with a towing vehicle for moving of the apparatus of the present invention from one location to another; and FIG. 7 is a side elevational view showing the apparatus of the present invention when in the position of the dolly being towed by the towing vehicle.

DETAILED DESCRIPTION OF THE SHOWN EMBODIMENT

Referring particularly to the drawings there is shown a seat section 10, a back rest section 12 and a leg rest section 14. Each of the sections 10, 12 and 14 can be constructed in any desirable manner. Basically, each of the sections 10, 12 and 14 are planar and are normally constructed of metallic tubing which defines the periphery of this particular section with fabric or plastic strips being stretched across this tubing to form the planar surfaces of each of the sections. The fabric or plastic strips are designed to provide comfort to the user when it is utilized as a chair as shown in FIG. 4.

Connecting the sections 10 and 12 is a pivot joint defined by connectors 16 and 18. Similar type of pivot connectors 20 and 22 connect the leg rest section 14 to the seat section 10. The actual construction of these pivot connectors 16, 18, 20 and 22 is deemed to be conventional and form no specific part of this invention. Each of the connectors 16, 18, 20 and 22 include a ratchet mechanism that will permit the leg rest assembly 14 to occupy different angular positions relative to seat section 10 and will also permit the back rest section 12 to be fixed at any one of a plurality of different inclined positions relative to seat section 10. Connectors 20 and 22 define a first pivot joint with connectors 16 and 18 defining a second pivot joint.

Seat section 10 includes side bars 24 and 26 located in a substantially spaced apart parallel relationship. Pivotally mounted on the bar 26 is a wheel mounting bar 28. A similar bar 30 is pivotally mounted on the bar 24. The bars 28 and 30 are each connected together by a cross bar 32. Connecting bar 30 and the cross bar 32 in an area near the center of the cross bar 32 is a bracing bar 34. In a similar manner, connecting the wheel mounting bar 28 and the cross bar 32 is a bracing bar 36. Again, one end of the bracing bar 36 is located very near the center of the cross bar 32. The cross bar 32 and the bracing bars 34 and 36 provide sufficient structural support to support wheel 38 which is rotatably mounted on wheel mounting bar 28 and wheel 40 which is rotationally mounted on the wheel mounting bar 24. Each of the wheels 38 and 40 are identical and are mounted by a cotter pin 42 on a shaft 44 with it being understood there are two in number of the shafts 44 located in an aligned manner. Each of the shafts 44 form a stub shaft upon which its respective wheel 38 and 40 is rotationally mounted.

The wheel assembly composed of wheels 38 and 40, cross bar 32, bracing bars 34 and 36 and wheel mounting bars 28 and 30 is movable between an upper position and a lower position. The upper position is shown in FIGS. 1 and 2 of the drawings and this is a position that the wheel assembly occupies when the apparatus of this invention is in its storage position. The wheel assembly is to be in the lower position, as shown in FIGS. 3, 4, 5 and 7, when the apparatus of this invention is being used.

Referring particularly to FIG. 3 of the drawings, the apparatus of this invention is shown as being used as a table with the section 14 forming the surface for the table. The wheels 38 and 40 are to be placed against the supportive surface 46. Pivotally mounted at the second joint and also being pivotally connected to bars 24 and 26 is a leg assembly in the form of U-shaped leg bar 48. Interconnecting the legs of the U-shaped leg bar 48 is a cross brace 50. It is to be understood that the members 48 and 50 are constructed of a thin walled tubing usually of aluminum or steel.

The leg bar 48 can occupy the withdrawn position shown in FIGS. 1 and 2 which places the leg bar 48 against the undersurface of the seat section 10. Also the leg bar 48 can be located in an out position which positions the leg bar 48 at a substantially right angled position relative to the seat section 10 as is clearly shown in FIGS. 3 and 4 of the drawings. The combination of the wheels 38 and 40 and the leg bar 48 forms a substantially planar upper surface formed by the leg rest assembly 14 as is shown in FIG. 3. Also in this position, the leg rest assembly 14 can be pivoted to a forward or outward position as shown in FIG. 4 in substantial alignment with the seat section 10. At this particular time the back rest section 12 is to be pivoted in an aft direction and can be located in substantial alignment with the seat section 10 as is shown in FIG. 4 or can be located at some fixed inclined position relative to the seat section 10 which is not shown. The position of FIG. 4 is the position the apparatus takes when being utilized as a chaise lounge type of chair.

With the wheel assembly in the lower position and the leg bar in the withdrawn position, there may be moved a bottom bar 52 from a retracted position located against the outer surface of the leg rest section 14 or against the seat section 10 (depending upon which position it is located in) to an outward position as shown in FIGS. 5 and 7 of the drawings. On this bottom bar 52 in the outward position there may be stacked various articles such as ice chest, blankets, umbrella and so forth that are intended to be transported. During this transporting, a handle bar 54 is moved from a retracted position shown in FIGS. 1, 2 and 3 to an extended position shown in FIGS. 5 and 7. The movement of the handle bar 54 between the retracted position and the protracted position is accomplished lineally with the handle bar 54 being mounted within a telescopic tube arrangement mounted in conjunction with the seat section 10. With the handle bar 54 in this extended position, the apparatus can be utilized as a dolly as clearly shown in FIG. 5.

Between the legs of the handle bar 54 there is located an aligned set of protrusions 56 and 58. Protrusion 58 is capable of being slipped within end 62 of tube 60. At the opposite end of the tube 60 is located a smaller diametered rod 64 with this rod 64 being manually movable by means of pin 66 which rides within elongated slot 68 formed within the tube 60. The pin 66 is to be located in a retracted position (not shown) and upon rod 64 being aligned with protrusion 56, the pin 66 is moved causing the rod 64 to be moved within the protrusion 56. This thereby fixedly secures the rod 60 in between the legs of the handle bar 54.

Fixedly secured to the tube 60 are a pair of tubes 70 and 72. Tubes 70 and 72 are fixedly secured together and have an outer end with fixed member 74 of a clamping band being fixedly secured by flange 80 to the outer end of the tube 70. Pivotally mounted to the fixed member 74 is a movable member 76. This movable member 76 includes a flange 78. Flange 78 can be positioned against flange 80 of the fixed member 74 of the clamping band.

With the flange 78 abutting against flange 80, the clamping band composed of members 74 and 76 needs to be mounted around a portion of a towing vehicle such as the seat post 82 of a bicycle 84. With the flange 78 located against flange 80, it is to be fixed in that position by means of a rod 86 which is to abut against the outer surface of the flange 78. The rod 86 is telescopingly mounted within the tube 72. This rod 86 is to be spring biased to the position shown in FIG. 6 by means of a spring (not shown) contained within the tube 72. When it is desired to disconnect the trailer hitch arrangement shown in FIG. 6 from the bicycle 84, the user only needs to manually move pin 88 which causes the rod 86 to be moved to a retracted position permitting the movable member 76 of the clamping band to be pivoted to affect disengagement from the seat post 82. It is to be noted that during transporting of the dolly of the apparatus of this invention, the apex section of the handle bar 54 will rest on the upper surface of the tubes 70 and 72 as is shown in FIG. 7 which will prevent the apparatus of this invention from coming into contact with the rear wheel 90 of the bicycle 84 and will support the apparatus 10 in a convenient towing position as is clearly shown in FIG. 7.

What is claimed is:

1. A combination chair, dolly and table apparatus comprising:

a seat section adapted to connect with the buttocks of a human when used as a chair;

a back rest section adapted to connect with the legs of a human when used as a chair;

a leg rest section adapted to connect with the legs of a human when used as a chair;

said back rest section being pivotally mounted by first pivot means to said seat section at a first pivot joint from a position located in juxtaposition with said seat section to an extended position which is defined as being any position from substantially perpendicular to said seat section to substantially in alignment with said seat section, said leg rest section being pivotally mounted by second pivot means to said seat section at a second pivot joint from a position located in juxtaposition with said seat section to an extended position which is in substantial alignment with said seat section;

a wheel assembly being mounted at said first pivot, joint, said wheel assembly being movable by pivotal connection means between an upper position and a lower position, said upper position being when said wheel assembly is located directly adjacent said seat section which is for storage, said lower position extends said wheel assembly permitting rolling of said wheel assembly on a supportive surface;

a handle assembly mounted on said seat section, said handle assembly being movable by movement means between a retracted position and a protracted position, with said handle assembly in said retracted position said handle assembly being in a stowage position not intended to be used and confined to said seat section, with said handle assembly in said protracted position said handle assembly facilitates manual grasping and movement of said apparatus on said wheel assembly permitting usage of said apparatus as a dolly; and a bottom bar pivotally mounted on said leg rest section at said first pivot point, said bottom bar being movable to an outward position when said leg rest section is in juxtaposition with said seat section with said bottom bar functioning as a supporting base.

2. The apparatus as defined in claim 1 wherein:

a leg assembly is mounted at said second pivot joint and is movable between a withdrawn position and a use position, said withdrawn position locating said leg assembly in juxtaposition with said seat section, said use position locating said leg assembly substantially transverse to said seat section permitting said leg assembly to rest against the supportive surface, with said leg assembly resting against the supportive surface and said wheel assembly in said lower position said apparatus is usable as a table with said leg rest section and said back rest section in juxtaposition with said seat section and as a chair when said leg rest section and said back rest sections are in their extended positions.

3. The apparatus as defined in claim 2 wherein:

both said leg assembly and said wheel assembly are mounted on the same side of said seat section.

4. The apparatus as defined in claim 1 wherein:

a trailer hitch assembly connectable with said handle assembly, said trailer hitch assembly for connection to a towing vehicle for transporting said apparatus on said wheel assembly.

* * * * *